United States Patent
You (10) Patent No.: US 10,508,677 B2
(45) Date of Patent: Dec. 17, 2019

(54) TAPERED THREAD CONNECTION PAIR (71) Applicant: Yihua You, Yuhuan (CN)

(72) Inventor: Yihua You, Yuhuan (CN)

( * ) Notice: Subject to any disclaimer, the term of this patent is extended or adjusted under 35 U.S.C. 154(b) by 98 days.

(21) Appl. No.: 15/987,902

(22) Filed: May 24, 2018

(65) Prior Publication Data

US 2018/0266470 A1   Sep. 20, 2018

Related U.S. Application Data (63) Continuation of application No. PCT/CN2016/107049, filed on Nov. 24, 2016.

(30) Foreign Application Priority Data

Nov. 24, 2015 (CN) .......................... 2015 1 0828096

(51) Int. Cl.
*F16B 33/02* (2006.01)
*F16B 35/04* (2006.01)
*F16B 39/282* (2006.01)

(52) U.S. Cl.
CPC ............ *F16B 33/02* (2013.01); *F16B 35/041* (2013.01); *F16B 39/282* (2013.01)

(58) Field of Classification Search
CPC ...... F16B 25/0078; F16B 33/00; F16B 33/02; F16B 35/041; F16B 39/00; F16B 39/282; F16B 39/36
USPC .......................... 411/265, 411, 424, 426, 436
See application file for complete search history.

(56) References Cited

U.S. PATENT DOCUMENTS

| | | | | |
|---|---|---|---|---|
| 1,090,976 A | * | 3/1914 | Encinas ................ | F16B 39/282 411/187 |
| 1,876,565 A | * | 9/1932 | Buckwalter ........... | E21B 17/042 403/334 |
| 1,953,095 A | * | 4/1934 | Baker ................... | E21B 17/042 403/307 |
| 2,036,604 A | * | 4/1936 | Pickop .................... | F16B 39/30 411/308 |
| 3,151,653 A | * | 10/1964 | Zahodfakin ........... | F16B 5/0208 411/267 |

(Continued)

FOREIGN PATENT DOCUMENTS

| CN | 1031587 A | 3/1989 |
|---|---|---|
| CN | 203847533 U | 9/2014 |

(Continued)

OTHER PUBLICATIONS

International Search Report of PCT/CN2016/107049 dated Mar. 2, 2017.

*Primary Examiner* — Roberta S Delisle
(74) *Attorney, Agent, or Firm* — Erson IP (Nelson IP)

(57) ABSTRACT

A tapered thread connection pair comprises an external thread and an internal thread. The external thread comprises an outside helical surface and a first end helical surface, the shape of the outside helical surface is the same as that of a spiral outside surface of a solid of revolution, and the shape of the first end helical surface is the same as that of a spiral end surface of the end having a moving direction that is the same as an axial movement direction of the solid of revolution. The internal thread comprises an inside helical surface and a second end helical surface. The shape of the inside helical surface is the same as that of the spiral outside surface of the solid of revolution.

10 Claims, 5 Drawing Sheets

(56) References Cited

U.S. PATENT DOCUMENTS

| | | | | |
|---|---|---|---|---|
| 3,586,353 | A | * | 6/1971 | Lorenz .................. E21B 17/042 |
| | | | | 285/334 |
| 3,887,990 | A | * | 6/1975 | Wilson .................... B23P 11/02 |
| | | | | 29/450 |
| 4,664,573 | A | * | 5/1987 | Isler .................... E21D 21/0006 |
| | | | | 411/432 |
| 4,712,955 | A | * | 12/1987 | Reece ................. F16B 13/0883 |
| | | | | 411/17 |
| 5,413,388 | A | | 5/1995 | Kolvereid |
| 5,779,410 | A | * | 7/1998 | Lautenschlager ...... A47B 95/00 |
| | | | | 411/33 |
| 5,964,766 | A | * | 10/1999 | Shaw ................... A61C 8/0022 |
| | | | | 411/411 |

FOREIGN PATENT DOCUMENTS

| | | | |
|---|---|---|---|
| CN | 105443543 | A | 3/2016 |
| CN | 205349976 | U | 6/2016 |
| WO | 8707928 | A1 | 12/1987 |

\* cited by examiner

TAPERED THREAD CONNECTION PAIR

CROSS-REFERENCE TO RELATED APPLICATIONS

This application is a continuation of international Patent Application No. PCT/CN2016/107049 with a filing date of Nov. 24, 2016, designating, the United States, and further claims priority to Chinese Patent Application No. 201510828096.5 with a filing date of Nov. 24, 2015. The content of the aforementioned applications, including any intervening amendments thereto, are incorporated herein by reference.

TECHNICAL FIELD

The present invention relates to the field of thread connection structure, and more particularly to a tapered thread connection pair.

BACKGROUND OF THE PRESENT INVENTION

A screw thread is a ridge wrapped around a cylinder or cone in the form of a helix. A screw thread is one of the first standardized mechanical structure elements, which has been widely used in all kinds of fields. The screw thread can be divided into many species and types with the one defined on a cylinder being called a straight thread, the one defined on a cone being called a tapered thread, and the one defined on an end surface of a cylinder or a truncated cone being called a plane thread. The screw thread defined on an outer circular surface of a main body is called an external thread, the screw thread defined on an inner circular surface of a main body is called an internal thread, and the screw thread defined on an end surface of a main body is called an end thread. The screw thread with its rotation direction and helix orientation following the left hand grip rule is called a left-handed thread, and the screw thread with its rotation direction and helix orientation following the right hand grip rule is called a right-handed thread. The screw thread with a single helix on a cross section of a main body is called a single-start thread, the screw thread with double helixes is called a double start thread, and the screw thread with multiple helixes is called a multi-start thread. The screw thread with a triangular cross section is called a triangular thread, the screw thread with a trapezoidal cross section is called a trapezoidal thread, the screw thread with a rectangular cross section is called a rectangular thread, and the screw thread with a zigzagging cross section is called a zigzagging thread. The screw thread used for fastening connection is called a fastening connection thread, the screw thread mainly used for transmission is called a transmission connection thread, and the screw thread used for conduit connection is called a conduit connection thread.

The screw thread of a fastener is the fastening connection thread, which is usually a cylinder thread with a triangle cross section, and is usually a right-handed thread while a left-handed thread is used for special use. The screw thread of a fastener is usually a single-start thread while a double-start or multi-start thread is used for celerity disassembly and assembly. The screw thread of a fastener comprises a screw thread pair, i.e. an internal thread and an external thread. The coupling nature of the screw thread pair is determining by the requirements of the connection system. The basic requirements of the fastener on the screw thread are loading-bearing and self-locking capability instead of transmission capability. The basic condition for self-locking thread is that an equivalent friction angle is no less than a lead angle. The value of an equivalent friction angle is related to a thread angle, the bigger the thread angle is, the bigger the equivalent friction angle is, and the more beneficial to self-locking that is the fundamental cause of the thread angle of fastener being 60° C. The wedge thread proposed in recent years, also called "Spiralock nut", is an improvement to both of the metric screw threads and English screw threads, aiming at improving the self-locking capability of the screw thread defined on a fastener. The metric screw threads include ISO metric threads (M screw threads), aerospace metric threads (MJ screw threads), small metric threads (S screw threads) and Russian screw threads (MR screw threads), etc. the English screw threads include unified screw threads (UN screw threads), aerospace inch threads (UNJ screw threads). Whitworth threads and so on. In the English screw threads the thread angle is 60° C. except that of the Whitworth thread.

The key factor for unthreading problem of the threaded fastener is the structure of the screw thread. In this case, the American engineers re-designed the geometric shape of the screw thread after researching on the shape the screw and force, loaded on the fastener. At the end of 1970s, the technology of screw thread called "Spiralock" was proposed. The structure of "Spiralock" thread is that a wedge surface with a 30° C. inclination is defined at the root of a negative thread (internal triangular thread, i.e. female thread). When the bolt is coupled with the nut, a teeth portion of the external thread of a standard bolt abuts against the wedge incline of the internal thread, and hence generating interference screw locking to increase locking force. The increase of the locking force is due to the change of the thread angle which hence makes the angle between the normal force between the internal and external threads and an axis of the bolt to be 60° C. instead of 30° C., i.e. the angle of a standard thread. Obviously, the normal force of "Spiralock" thread is significantly greater than fasten stress. Thus, the locking friction generated is greatly increased. The technical level and professional direction are always focused on thread angles in researching on and solving the unthreading problem of threaded fasteners. The wedge threads are no exception. Moreover, the wedge threads are only partial variation of triangle threads. There is no wedge thread pair in use, and the wedge thread can be only used as female which couples with an external triangle thread. The locking force of the wedge thread is determined by the thread angle, and the loading force and self-locking capability of the wedge thread is the same as those of conventional thread techniques. The bolt or nut in the prior art has the defect of being easy unthreaded. With frequent shock of the device, the gap between the connection elements is increased, and the bolt and nut are hence unthreaded, or even fell out. In this case, it is easy for connectors in mechanical connection to depart from each other, or even cause security incident.

Aiming at the defects in the prior art, there has been a long-term exploration, and kinds of solutions have been proposed. For example, Chinese patent No. 201410521899.1 discloses a lock nut with changed thread pattern which comprises a nut body with an internal thread, a spiraling-up conic surface is defined on crest of the internal thread. As a preferred embodiment, an angle between a generatrix of the conic surface and center axis of the internal thread is 30° C. As a preferred embodiment, two ends of the nut body are an entrance and an exit of the bolt respectively. The entrance of the bolt extends outwardly to form a step, an inclination of a step surface of the step is S, an edge of the exit of the bolt is an inclined surface with an inclination of D. As an improvement of above preferred embodiment, the S is ranged from 20° C. to 30° C., and the D is 30° C.

Above solution an improvement to a certain extent in solving the problem of easy looseness of connection between thread connection pair in prior art. However, there are still the problems of low bonding strength, low self-locking capability and low loading capability in above solution.

SUMMARY OF PRESENT INVENTION

Aiming at above technical problems, an object of the disclosure is to provide a tapered-thread connection pair with professional design, simple structure, good connection performance, high self-locking capability. The key point of the disclosure is the structure of tapered threads of the connection pair.

In order to achieve above objects, technical solutions of the present disclosure are as follows:

A tapered-thread connection pair, comprises an external thread and an internal thread in a threaded connection with each other; the external thread is defined on a main body, and the internal thread is defined in a connection hole; the external thread comprises an outside helical surface and a first end helical surface; a shape of the outside helical surface is the same as a shape of a lateral surface of a first solid of revolution formed by using a first right trapezoid as a generatrix, rotating uniformly around a cathetus of the first right trapezoid which is coincident with a center axis of the main body, and synchronously, axially and uniformly moving the first right trapezoid along the center axis of the main body; a shape of the first end helical surface is the same as a shape of helical end surface with a same direction as an axial moving direction of the first solid of revolution; each rotation of the tapered external thread is in a geometrical shape of a helical external cone; the outside helical surface is a helical external conical surface of the helical external cone; the first end helical surface is a helical end surface of the helical external cone; a first cone angle is formed between the outside helical surfaces; the internal thread comprises an inside helical surface and a second end helical surface; a shape of the inside helical surface is the same as a shape of a lateral surface of a second solid of revolution formed by using a second right trapezoid as a generatrix, rotating uniformly around a cathetus of the second right trapezoid which is coincident with a center axis of the connection hole, and synchronously, axially and uniformly moving the second right trapezoid along the center axis of the connection hole; each rotation of the tapered internal thread is in a geometrical shape of a helical internal cone; the inside helical surface is a helical internal conical surface of the helical internal cone; the second end helical surface is a helical end surface of the helical internal cone; a second cone angle is formed between the inside helical surfaces. When the tapered-thread connection pair in the present disclosure is in use, the outside and inside helical surfaces are matched with each other and are sized until interference fitting to achieve the technical performances such as the connection property, locking property, anti-loosening performance, loading capability, sealing performance and so on. Namely, the outside and inside helical surfaces are sized under the guiding of the helix until interference contacting, so that the technical performances such as the connection property, locking property, anti-loosening performance, loading capability, sealing performance and so on are achieved. It should be noted that the matching between the internal and external cones is the matching between the outside and inside conical surfaces in fact. In other words, when the internal and external cones match with each other, the matching surfaces between them are conical surfaces. In order to realize self-locking, the internal and external cones must satisfy some requirements which are relative to the conical surface and conical degree (cone angle) of the cone and are irrelevant to the end surface of the cone. However, it does not mean that a cone with any conical degree can be self-locked. In order words, it does not mean a cone with any cone angle can be self-locked. When the internal and external cones match with each, they can be self-locked only when the first cone angle of the outside helical surfaces and the second cone angle of the inside helical surfaces are in a certain rang. Therefore, the technical performances such as the loading capability, self-locking capability, anti-loosening performance, sealing performance and so on are irrelevant to the external helix guiding angle and internal helix guiding angle and are relative to the first cone angle of the outside helical surfaces and the second cone angle of the inside helical surfaces. In other words, the technical performances such as the loading capability, self-locking capability, anti-loosening performance, sealing performance and so on are mainly determined by the first cone angle of the outside helical surfaces and the second cone angle of the inside helical surfaces, and are also relative to friction factors of the main body and the connection hole to some extent.

In above tapered-thread connection pair, when the first right trapezoid goes through one rotation, a distance that the first right trapezoid axially moves is equal to or greater than a length of the cathetus of the first right trapezoid; and when the second right trapezoid goes through one rotation, a distance that the second right trapezoid axially moves is equal to or greater than a length of the cathetus of the second right trapezoid. This structure ensures the outside and inside helical surfaces are enough in length, and enough strength is ensured when the outside helical surface matches with the inside helical surface.

In above tapered-thread connection pair, when the first right trapezoid goes through one rotation, a distance that the first right trapezoid axially moves is equal to a length of the cathetus of the first right trapezoid; and when the second right trapezoid goes through one rotation, a distance that the second right trapezoid axially moves is equal to a length of the cathetus of the second right trapezoid. This structure ensures the outside helical surface is enough in length, and enough strength is ensured when the outside helical surface matches with the metric thread or inside helical surface.

In above tapered-thread connection pair, both the outside helical surface and the first end helical surface are continuous helical surfaces or non-continuous helical surfaces; and both the inside helical surface and the second end helical surface are continuous helical surfaces or non-continuous helical surfaces. Preferably, both the outside helical surface and the first end helical surface are continuous helical surfaces; and both the inside helical surface and the second end helical surface are continuous helical surfaces.

In above tapered-thread connection pair, a first transitional guiding surface is arranged between the outside helical surface and the first end helical surface on a same rotation. The first transitional guiding surface, as a helical end surface of the external cone, is designed based on the first end helical surface and is a variation of the first end helical surface to facilitate the matching between the internal and external threads and to be used as a design and manufacture rule. The first transitional guiding surface facilitates the manufacture of the outside helical surface and the first end helical surface, protects the internal and external threads from interference when they matching with each other and makes the matching more effective. A second transitional guiding surface is arranged between the inside helical surface and the second end helical surface on a same rotation. The second transitional guiding surface, as a helical end surface of the external cone, is designed based on the second end helical surface and is a variation of the second end helical surface to facilitate the matching between the internal and external threads and to be used as a design and manufacture rule. The second transitional guiding surface facilitates the manufacture of the outside helical surface and the second end helical surface, protects the internal and external threads from interference when they matching with each other and makes the matching more effective. A helical external thread line is formed between two adjacent outside helical surfaces. A vertical distance between the highest point and the lowest point of the external thread line, i.e. a height of the external helix guiding angle, is much less than a height of thread angle of the screw thread in prior art. Such comparison is based on the prerequisite that the pitch, of the external thread in the present disclosure is the same as that of the external thread in prior art. The practical meaning is that the semi-cone angle of the first cone angle of the external helical surface is less than thread bottom angle of the tooth-type thread. The height of the thread angle refers to thread height or thread depth of tooth-type thread, i.e. metric internal thread. An external helix guide angle ($\beta 1$) is defined as an angle between an inclined surface formed by a highest point and a lowest point of the external thread line and an axis of the tapered thread. The screw thread is with a more compact structure, higher strength, higher loading capability and better mechanical sealing performance, and a physical space for manufacturing the tapered external thread is larger. A helical internal thread line is formed between two adjacent outside helical surfaces. A vertical distance between the highest point and the lowest point of the internal thread line, i.e. a height of the internal helix guiding angle, is much less than a height of thread angle of the screw thread in prior art. Such comparison is based on the prerequisite that the pitch of the internal thread in the present disclosure is the same as that of the internal thread in prior art. The practical meaning is that the semi-cone angle of the second cone angle of the internal helical surface is less than thread bottom angle of the tooth-type thread. The height of the thread angle refers to thread height or thread depth of tooth-type thread, i.e. metric internal thread. An internal helix guide angle ($\beta 2$) is defined as an angle between an inclined surface formed by a highest point and a lowest point of the internal thread line and an axis of the tapered thread. The screw thread is with a more compact structure, higher strength, higher loading capability and better mechanical sealing performance, and a physical space for manufacturing the tapered internal thread is larger.

In above tapered-thread connection pair, one end of the main body is an insertion end to be inserted into the connection hole; a big end in each rotation of the first end helical surface is orientated towards the insertion end of the main body; an orientation of a big end in each rotation of the second end helical surface is the same as that of the first end helical surface. The outside helical surface and the inside helical surface are coupled with interference fit. Namely, a spiral direction of the outside helical surface is the same as that of the inside helical surface, and the orientations of their big ends are both towards the insertion end. The fastening function is realized through the interference fit between the outside and inside helical surfaces.

In above tapered-thread connection pair, one end of the main body is an insertion end to be inserted into the connection hole; a small end in each rotation of the first end helical surface is orientated towards the insertion end of the main body; an orientation of small end in each rotation of the second end helical surface is the same as that of the first end helical surface. The outside helical surface and the inside helical surface are coupled with interference fit. Namely, a spiral direction of the outside helical surface is the same as that of the inside helical surface, and the orientations of their small ends are both towards the insertion end. The fastening function is realized through the interference fit between the outside and inside helical surfaces.

In above tapered-thread connection pair, one end of the main body is an insertion end to be inserted into the connection hole; a big end in each rotation of the first end helical surface is orientated towards the insertion end of the main body; an orientation of a big end in each rotation of the second end helical surface is opposite to that of the first end helical surface. A portion where an intersection line running through the inside helical surface and the second end helical surface on a same rotation of the connection hole locates and the outside helical surface of the main body are coupled with interference fit. Namely, a spiral direction of the outside helical surface is opposite to that of the inside helical surface, and the orientations of the big ends of the outside helical surfaces are towards the insertion end. The fastening function is realized through the interference fit between the portion where an intersection line running through the inside helical surface and the second end helical surface on a same rotation of the connection hole locates and the outside helical surface of the main body.

In above tapered-thread connection pair, one end of the main body is an insertion end to be inserted into the connection hole; a small end in each rotation of the first end helical surface is orientated towards the insertion end of the main body; an orientation of a small end in each rotation of the second end helical surface is opposite to that of the first end helical surface. A portion where an intersection line running through the inside helical surface and the second end helical surface locates and the outside helical surface are coupled with interference fit. Namely, a spiral direction of the outside helical surface is opposite to that of the inside helical surface, and the orientations of the small ends of the outside helical surfaces are towards the insertion end. The fastening function is realized through the interference fit between the portion where an intersection line running through the inside helical surface and the second end helical surface locates and the outside helical surface of the main body.

In above tapered-thread connection pair, a head portion with a diameter greater than that of the main body is arranged at an end of the main body. The main body can be a bolt without the head portion with a diameter greater than that of the main body. The connection hole is a connection hole defined on workpiece, such as a nut.

Compared with prior art, the tapered-thread connection pair in this disclosure have the following advantageous of professional design, simple structure, easy operation, high locking force, high loading capability, good anti-loosening property, good mechanical sealing property, good stability and high self-locking capability. The fastening and connection functions can be realized by sizing between the internal and external cones until they are coupling with interference fit. The tapered-thread connection pair is capable of avoiding unthreading.

In the drawings, 1—main body; 11—outside helical surface; 12—first end helical surface; 13—first transitional guiding surface; 2—connection hole; 21—inside helical surface; 22—second end helical surface; 23—second transitional guiding surface; 3—nut; 4—external thread line; 5—internal thread line; 6—external thread; 61—head portion; 7—internal thread; $\alpha 1$—first cone angle; $\alpha 2$—second cone angle; $\beta 1$—external helix guiding angle; and $\beta 2$—internal helix guiding angle.

DETAILED DESCRIPTION OF PREFERRED EMBODIMENTS

The present invention is further described below in combination with drawings and embodiments.

Embodiment 1

Figure 1:
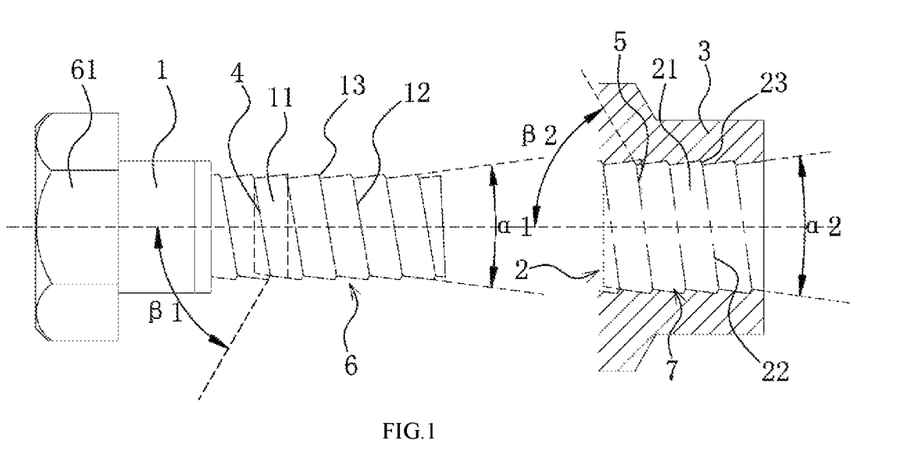
FIG. 1 is a schematic exploded view of a tapered-thread connection pair according to the present invention.
Figure 2:
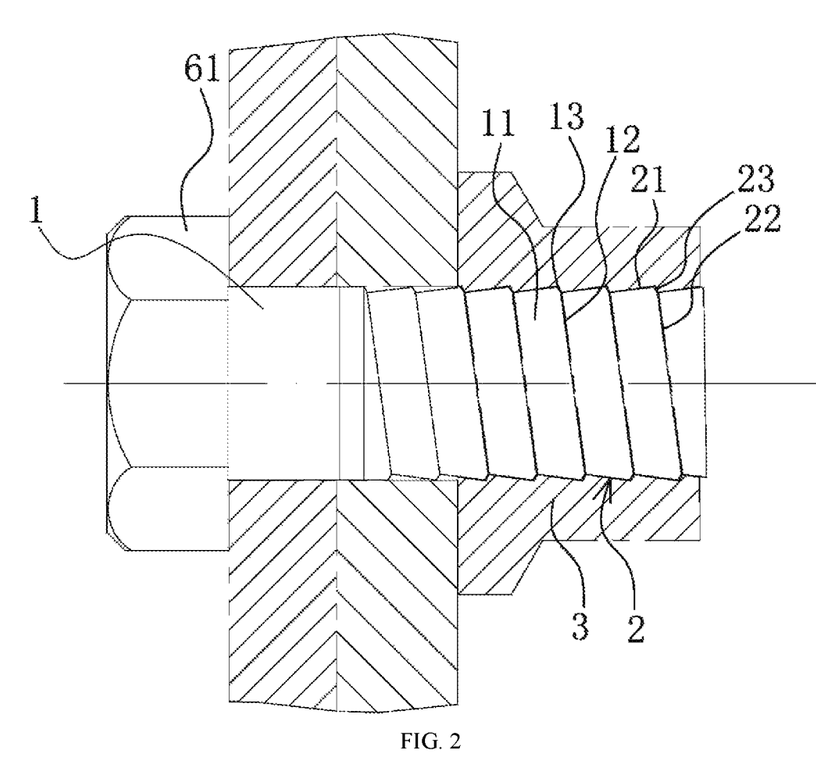
FIG. 2 is a schematic assembled view of the tapered-thread connection pair according, to the present invention.

As shown in FIG. 1 and FIG. 2, a tapered-thread connection pair, comprises an external thread 6 and an internal thread 7 in a threaded connection with each other. The external thread 6 is defined on a main body 1, and the internal thread 7 is defined in a connection hole 2. A head portion 61 with a diameter greater than that of the main body 1 is arranged at an end of the main body 1. The connection hole 2 is a screw hole 2 defined in a workpiece such as a nut 3. The external thread 6 comprises an outside helical surface 11 and a first end helical surface 12. A shape of the outside helical surface 11 is the same as a shape of a lateral surface of a first solid of revolution formed by using a first right trapezoid as a generatrix, rotating uniformly around a cathetus of the first right trapezoid which is coincident with a center axis of the main body 1, and synchronously, axially and uniformly moving the first right trapezoid along the center axis of the main body 1. A shape of the first end helical surface 12 is the same as a shape of helical end surface with a same direction as an axial moving direction of the first solid of revolution. Each rotation of the tapered external thread 6 is in a geometrical shape of a helical external cone. The outside helical surface 11 is a helical external conical surface of the helical external cone. The first end helical surface 12 is a helical end surface of the helical external cone. A first cone angle $\alpha 1$ is formed between the outside helical surfaces 11. The internal thread 7 comprises an inside helical surface 21 and a second end helical surface 22. A shape of the inside helical surface 21 is the same as a shape of a lateral surface of a second solid of revolution formed by using a second right trapezoid as a generatrix, rotating uniformly around a cathetus of the second right trapezoid which is coincident with a center axis of the connection hole 2, and synchronously, axially and uniformly moving the second right trapezoid along the center axis of the connection hole 2. Each rotation of the tapered internal thread 7 is in a geometrical shape of a helical internal cone. The inside helical surface 21 is a helical internal conical surface of the helical internal cone. The second end helical surface 22 is a helical end surface of the helical internal cone. A second cone angle $\alpha 2$ is formed between the inside helical surfaces 21. When the tapered-thread connection pair in the present disclosure is in use, the outside and inside helical surfaces 11 and 21 are matched with each other and are sized until interference fitting to achieve the technical performances such as the connection property, locking property, anti-loosening performance, loading capability, sealing performance and so on. Namely, the outside and inside helical surfaces 11 and 21 are sized under the guiding of the helix until interference contacting, so that the technical performances such as the connection property, locking property, anti-loosening performance, loading capability, sealing performance and so on are achieved. It should be noted that the matching between the internal and external cones is the matching between the outside and inside conical surfaces in fact. In other words, when the internal and external cones match with each other, the matching surfaces between them are conical surfaces. In order to realize self-locking, the internal and external cones must satisfy some requirements which are relative to the conical surface and conical degree (cone angle) of the cone and are irrelevant to the end surface of the cone. However, it does not mean that a cone with any conical degree can be self-locked. In order words, it does not mean a cone with any cone angle can be self-locked. When the internal and external cones match with each, they can be self-locked only when the first cone angle $\alpha 1$ of the outside helical surfaces 11 and the second cone angle $\alpha 2$ of the inside helical surfaces 21 are in a certain rang. Therefore, the technical performances such as the loading capability, self-locking capability, anti-loosening performance, sealing performance and so on are irrelevant to the external helix guiding angle $\beta 1$ and internal helix guiding angle $\beta 2$ and are relative to the first cone angle $\alpha 1$ of the outside helical surfaces 11 and the second cone angle $\alpha 2$ of the inside helical surfaces 21. In other words, the technical performances such as the loading capability, self-locking capability, anti-loosening performance, sealing performance and so on are mainly determined by the first cone angle of $\alpha 1$ the outside helical surfaces 11 and the second cone angle $\alpha 2$ of the inside helical surfaces 21, and are also relative to friction factors of the main body and the connection hole to some extent.

Specifically, when the first right trapezoid goes through one rotation, a distance that the first right trapezoid axially moves is equal to or greater than a length of the cathetus of the first right trapezoid; and when the second right trapezoid goes through one rotation, a distance that the second right trapezoid axially moves is equal to or greater than a length of the cathetus of the second right trapezoid. This structure ensures the outside and inside helical surfaces 11 and 21 are enough in length, and enough strength is ensured when the outside helical surface 11 matches with the inside helical surface 21. In this embodiment, both the outside helical surface 11 and the first end helical surface 12 are continuous helical surfaces or non-continuous helical surfaces; and both the inside helical surface 21 and the second end helical surface 22 are continuous helical surfaces or non-continuous helical surfaces. Preferably, both the outside helical surface 11 and the first end helical surface 12 are continuous helical surfaces; and both the inside helical surface 21 and the second end helical surface 22 are continuous helical surfaces.

Further, a first transitional guiding surface 13 is arranged between the outside helical surface 11 and the first end helical surface 12 on a same rotation. The first transitional guiding surface, 13 as a helical end surface of the external cone, is designed based on the first end helical surface 12 and is a variation of the first end helical surface 12 to facilitate the matching between the internal and external threads and to be used as a design and manufacture rule. The first transitional guiding surface 13 facilitates the manufacture of the outside helical surface 11 and the first end helical surface 12, protects the internal and external threads from interference when they matching with each other and makes the matching more effective. A helical external thread line 4 is formed between two adjacent outside helical surfaces 11. A vertical distance between the highest point and the lowest point of the external thread line 4, i.e. a height of the external helix guiding angle $\beta 1$, is much less than a height of thread angle of the screw thread in prior art. Such comparison is based on the prerequisite that the pitch of the external thread 6 in the present disclosure is the same as that of the external thread in prior art. The practical meaning is that the semi-cone angle of the first cone angle $\alpha 1$ of the external helical surface 11 is less than thread bottom angle of the tooth-type thread. The height of the thread angle refers to thread height or thread depth of tooth-type thread, i.e. metric internal thread. An external helix guide angle $\beta 1$ is defined as an angle between an inclined surface formed by a highest point and a lowest point of the external thread line 4 and an axis of the tapered thread. The screw thread is with a more compact structure, higher strength, higher loading capability and better mechanical sealing performance and a physical space for manufacturing the tapered external thread is larger. A second transitional guiding surface 23 is arranged between the inside helical surface 21 and the second end helical surface 22 on a same rotation. The second transitional guiding surface 23, as a helical end surface of the external cone, is designed based on the second end helical surface 21 and is a variation of the second end helical surface 21 to facilitate the matching between the internal and external threads and to be used as a design and manufacture rule. The second transitional guiding surface 23 facilitates the manufacture of the outside helical surface 21 and the second end helical surface 22, protects the internal and external threads from interference when they matching with each other and makes the matching more effective. A helical internal thread line 5 is formed between two adjacent outside helical surfaces 21. A vertical distance between the highest point and the lowest point of the internal thread line 5, i.e. a height of the internal helix guiding angle $\beta 2$, is much less than a height of thread angle of the screw thread in prior art. Such comparison is based on the prerequisite that the pitch of the internal thread 7 in the present disclosure is the same as that of the internal thread in prior art. The practical meaning is that the semi-cone angle of the second cone angle $\alpha 2$ of the internal helical surface 21 is less than thread bottom angle of the tooth-type thread. The height of the thread angle refers to thread height or thread depth of tooth-type thread, i.e. metric internal thread. An internal helix guide angle $\beta 2$ is defined as an angle between an inclined surface formed by a highest point and a lowest point of the internal thread line 5 and an axis of the tapered thread. The screw thread is with a more compact structure, higher strength, higher loading capability and better mechanical sealing performance, and a physical space for manufacturing the tapered internal thread is larger.

More specifically, one end of the main body 1 is an insertion end to be inserted into the connection hole 2. A big end in each rotation of the first end helical surface 12 is orientated towards the insertion end of the main body 1. An orientation of a big end in each rotation of the second end helical surface 22 is the same as that of the first end helical surface 12. The outside helical surface 11 and the inside helical surface 21 are coupled with interference fit. Namely, a spiral direction of the outside helical surface 11 is the same as that of the inside helical surface 12, and the orientations of their big ends are both towards the insertion end. The fastening function is realized through the interference fit between the outside and inside helical surfaces 11 and 21.

Embodiment 2

Figure 3:
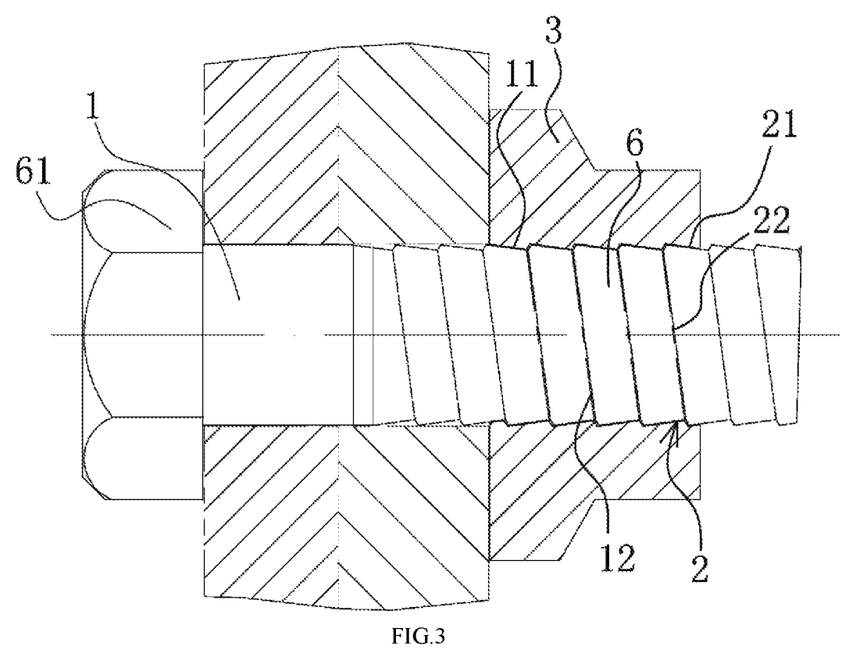
FIG. 3 is a schematic assembled view of a tapered-thread connection pair according to the present invention.

As shown in FIG. 3, the structure, principle and implementing method of the tapered-thread connection pair in this embodiment are similar to those of the first embodiment. The differences are that one end of the main body 1 in this embodiment is an insertion end to be inserted into the connection hole 2, a small end in each rotation of the first end helical surface 12 is orientated towards the insertion end of the main body 1, and an orientation of a small end in each rotation of the second end helical surface 22 is the same as that of the first end helical surface 12. The outside helical surface 11 and the inside helical surface 21 are coupled with interference fit. Namely, a spiral direction of the outside helical surface 11 is the same as that of the inside helical surface 21, and the orientations of their small ends are both towards the insertion end. The fastening function is realized through the interference fit between the outside and inside helical surfaces 11 and 21.

Embodiment 3

Figure 4:
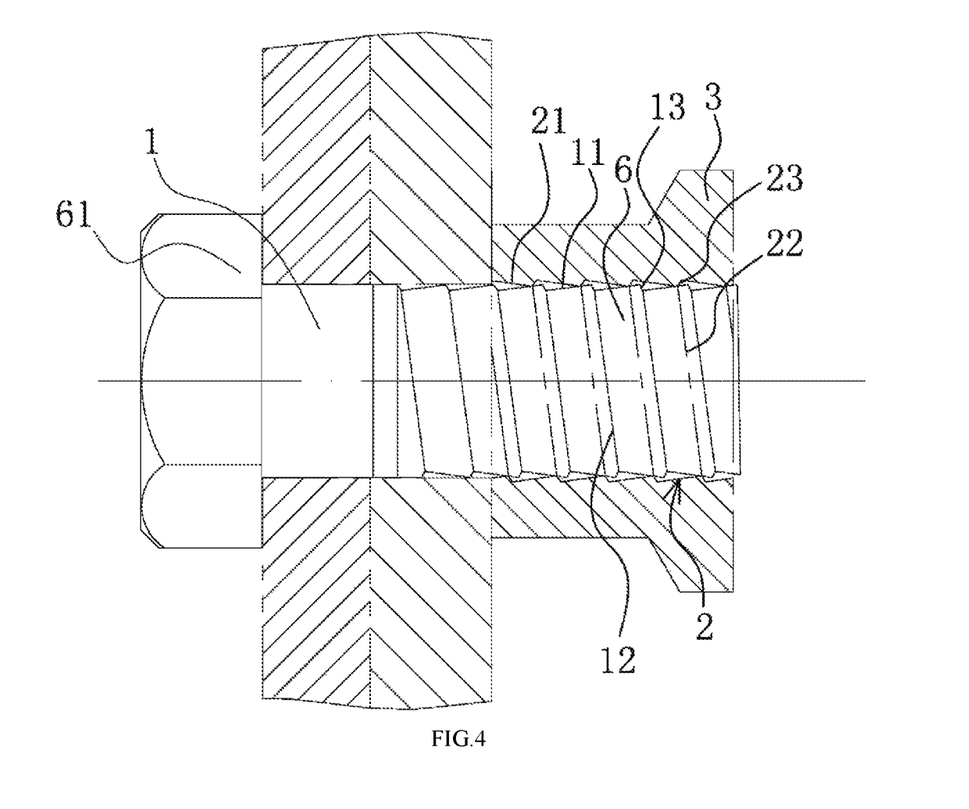
FIG. 4 is a schematic assembled view of a tapered-thread connection pair according to the present invention.

As shown in FIG. 4, the structure, principle and in implementing method of the tapered-thread connection pair in this embodiment are similar to those of the first embodiment. The differences are that one end of the main body 1 is an insertion end to be inserted into the connection hole 2, a big end in each rotation of the first end helical surface 11 is orientated towards the insertion end of the main body 1, an orientation of a big end in each rotation of the second end helical surface 21 is opposite to that of the first end helical surface 11, a portion where an intersection line running through the inside helical surface 21 and the second end helical surface 22 on a same rotation of the connection hole 2 locates and the outside helical surface 11 of the main body 1 are coupled with interference fit. Namely, a spiral direction of the outside helical surface 11 is opposite to that of the inside helical surface 21, and the orientations of the big ends of the outside helical surfaces 11 are towards the insertion end. The fastening function is realized through the interference fit between the portion where an intersection line running through the inside helical surface 21 and the second end helical surface 22 on a same rotation of the connection hole 2 locates and the outside helical surface 11 of the main body 1.

Embodiment 4

Figure 5:
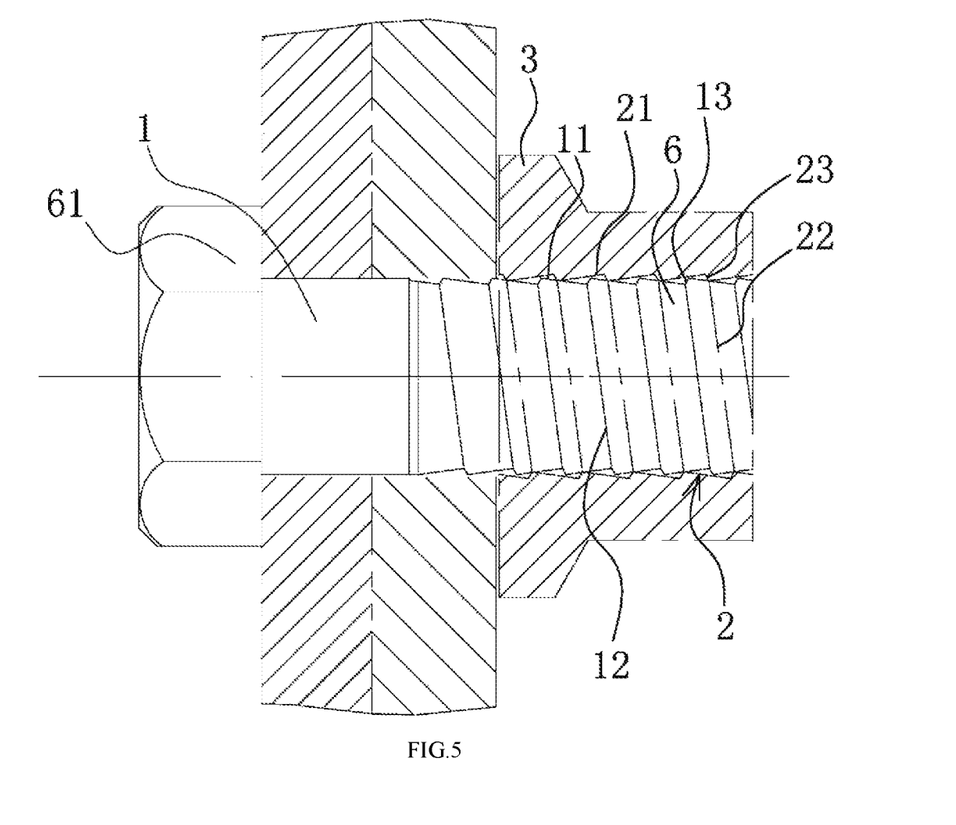
FIG. 5 is a schematic assembled view of a tapered-thread connection pair according to the present invention.

As shown in FIG. 5, the structure, principle and implementing method of the tapered-thread connection pair in this embodiment are similar to those of the first embodiment. The differences are one end of the main body 1 is an insertion end to be inserted into the connection hole 2, a small end in each rotation of the first end helical surface 12 is orientated towards the insertion end of the main body 1, an orientation of a small end in each rotation of the second end helical surface 22 is opposite to that of the first end helical surface 12, a portion where an intersection line running through the inside helical surface 21 and the second end helical surface 22 locates and the outside helical surface 11 are coupled with interference fit. Namely, a spiral direction of the outside helical surface 11 is opposite to that of the inside helical surface 21, and the orientations of the small ends of the outside helical surfaces 11 are towards the insertion end. The fastening function is realized through the interference fit between the portion where an intersection line running through the inside helical surface 21 and the second end helical surface 22 locates and the outside helical surface 11 of the main body 1.

The specific embodiments described in this disclosure are exemplary illustrations to the spirit of the present invention. It is obvious to one of ordinary skill in the art to make modifications and/or supplementary and/or obtain equivalence using a similar principle under the teaching of this disclosure without departing from the spirit of the present invention or being beyond the protection scope defined in the claims.

Understandably, the structure of the tapered-thread connection pair can be widely implemented on all kinds of products, such as bolt and nut with threaded structures, valves with threaded structure, transmission mechanisms, containers and so on, as long as the products have internal and external threads coupling with each other.

Although terms such as main body 1, outside surface 11, first end helical surface 12, first transitional guiding surface 13, connection hole 2, inside helical surface 21, second end helical surface 22, second transitional guiding surface 23, nut 3, external thread line 4, internal thread line 5, external thread 6, head portion 61, internal thread 7, first cone angle $\alpha1$, second cone angle $\alpha2$, external helix guiding angle $\beta1$, and internal helix guiding angle $\beta2$ and so on have been widely used in the present disclosure, other terms can also be used alternatively. These terms are only used to better description and illustration the essence of the present invention. It departs from the spirit of the present invention to deem it as any limitation of the present invention.

I claim:

1. A tapered-thread connection pair, comprising an external thread and an internal thread in a threaded connection with each other; wherein the external thread is defined on a main body, and the internal thread is defined in a connection hole; the external thread comprises an outside helical surface and a first end helical surface; a shape of the outside helical surface is the same as a shape of a lateral surface of a first solid of revolution formed by using a first right trapezoid as a generatrix, rotating uniformly around a cathetus of the first right trapezoid which is coincident with a center axis of the main body, and synchronously, axially and uniformly moving the first right trapezoid along the center axis of the main body; a shape of the first end helical surface is the same as a shape of helical end surface with a same direction as an axial moving direction of the first solid of revolution; the internal thread comprises an inside helical surface and a second end helical surface; a shape of the inside helical surface is the same as a shape of a lateral surface of a second solid of revolution formed by using a second right trapezoid as a generatrix, rotating uniformly around a cathetus of the second right trapezoid which is coincident with a center axis of the connection hole, and synchronously, axially and uniformly moving the second right trapezoid along the center axis of the connection hole; a shape of the second end helical surface is the same as a shape of helical end surface with a same direction as an axial moving direction of the second solid of revolution; a first cone angle ($\alpha1$) is formed between outside helical surfaces; a second cone angle ($\alpha2$) is formed between inside helical surfaces; the external thread is in a geometrical shape of a helical external cone; the outside helical surface is a helical external conical surface of the helical external cone; the first end helical surface is a helical end surface of the helical external cone; the internal thread is in a geometrical shape of a helical internal cone; the inside helical surface is a helical internal conical surface of the helical internal cone; the second end helical surface is a helical end surface of the helical internal cone; the outside and inside helical surfaces are matched with each other and are centralized under the guiding of a helix until interference contacting; the internal and external cones are sized until interference fitting; a helical external thread line is formed between two adjacent outside helical surfaces; an external helix guide angle ($\beta1$) is defined as an angle between an inclined surface formed by a highest point and a lowest point of the external thread line and an axis of the external thread; a helical internal thread line is formed between two adjacent inside helical surfaces; an internal helix guide angle ($\beta2$) is defined as an angle between an inclined surface formed by a highest point and a lowest point of the internal thread line and an axis of the internal thread; self-locking capability, leak-tightness, loading capability of the tapered thread connection pair is determined by values of the first cone angle ($\alpha1$) of the outside helical surfaces and a second cone angle ($\alpha2$) of inside helical surfaces; and fastening and connecting functions are realized by sizing of internal and external cones until interference fitting.

2. The tapered-thread connection pair according to claim 1, wherein when the first right trapezoid goes through one rotation, a distance that the first right trapezoid axially moves is equal to or greater than a length of the cathetus of the right trapezoid; and when the second right trapezoid goes through one rotation, a distance that the second right trapezoid axially moves is equal to or greater than a length of the cathetus of the right trapezoid.

3. The tapered-thread connection pair according to claim 2, wherein when the first right trapezoid goes through one rotation, a distance that the first right trapezoid axially moves is equal to a length of the cathetus of the right trapezoid; and when the second right trapezoid goes through one rotation, a distance that the second right trapezoid axially moves is equal to a length of the cathetus of the right trapezoid.

4. The tapered-thread connection pair according to claim 1, wherein both the outside helical surface and end helical surface are continuous helical surfaces or non-continuous helical surfaces; and both the inside helical surface and the second end helical surface are continuous helical surfaces or non-continuous helical surfaces.

5. The tapered-thread connection pair according to claim 1, wherein a first transitional guiding surface is arranged between the outside helical surface and the first end helical surface on a same rotation; and a second transitional guiding surface is arranged between the inside helical surface and the second end helical surface on a same rotation.

6. The tapered-thread connection pair according to claim 1, wherein one end of the main body is an insertion end to be inserted into the connection hole; a big end in each rotation of the first end helical surface is orientated towards the insertion end of the main body; an orientation of a big end in each rotation of the second end helical surface is the same as that of the first end helical surface.

7. The tapered-thread connection pair according to claim 6, wherein a head portion with a diameter greater than that of the main body is arranged at an end of the main body; and the connection hole is a connection hole defined on a nut.

8. The tapered-thread connection pair according to claim 1, wherein one end of the main body is an insertion end to be inserted into the connection hole; a small end in each rotation of the first end helical surface is orientated towards the insertion end of the main body; an orientation of a small end in each rotation of the second end helical surface is the same as that of the first end helical surface.

9. The tapered-thread connection pair according to claim 1, wherein one end of the main body is an insertion end to be inserted into the connection hole; a big end in each rotation of the first end helical surface is orientated towards the insertion end of the main body; an orientation of a big end in each rotation of the second end helical surface is opposite to that of the first end helical surface.

10. The tapered-thread connection pair according to claim 1, wherein one end of the main body is an insertion end to be inserted into the connection hole; a small end in each rotation of the first end helical surface is orientated towards the insertion end of the main body; an orientation of a small end in each rotation of the second end helical surface is opposite to that of the first end helical surface.

* * * * *